(12) United States Patent
Radcliffe et al.

(10) Patent No.: US 11,526,828 B2
(45) Date of Patent: Dec. 13, 2022

(54) CALCULATING DEVELOPER TIME DURING DEVELOPMENT PROCESS

(71) Applicant: International Business Machines Corporation, Armonk, NY (US)

(72) Inventors: Rosalind Toy Allen Radcliffe, Durham, NC (US); Hannah Justine Neumann, Durham, NC (US); Arthi Ireddy, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 16/943,210

(22) Filed: Jul. 30, 2020

(65) Prior Publication Data
US 2022/0036278 A1    Feb. 3, 2022

(51) Int. Cl.
*G06Q 10/06*   (2012.01)
*G06F 40/20*   (2020.01)
*G06F 8/70*    (2018.01)

(52) U.S. Cl.
CPC ......... *G06Q 10/06398* (2013.01); *G06F 8/70* (2013.01); *G06F 40/20* (2020.01)

(58) Field of Classification Search
None
See application file for complete search history.

(56) References Cited

U.S. PATENT DOCUMENTS

| 8,032,863 | B2 | 10/2011 | Kolawa et al. |
| 10,331,437 | B2 * | 6/2019 | Boss .......................... G06F 8/70 |
| 10,410,152 | B2 | 9/2019 | Apshankar et al. |

(Continued)

FOREIGN PATENT DOCUMENTS

| AU | 2019261793 A1 * | 5/2020 | ............... G06F 8/60 |
| CN | 108629558 A | 10/2018 | |

OTHER PUBLICATIONS

Richard E. Fairley, Managing and Leading Software Projects, 2009, IEEE Computer Society, John Wiley & Sons, Inc. (Year: 2009).*

(Continued)

*Primary Examiner* — Shelby A Turner
*Assistant Examiner* — Matthew H Divelbiss
(74) *Attorney, Agent, or Firm* — Cantor Colburn LLP; Teddi Maranzano

(57) ABSTRACT

Aspects of the invention include computer-implemented methods, computing systems and computer program products for calculating an active time on a software application with respect to a first work item. A computer-implemented method includes retrieving activity data from a software development application and a plurality of input signals generated by a peripheral device. The method further includes determining a causal relationship between the input data and any events described by the activity data. In response to a determination of a causal relationship, a first time interval is calculated between an initial signal and a final signal of the plurality of input signals. The first time interval is compared to an estimated time interval. A schedule of a second work item is determined based on the comparison, wherein the first time interval relates to a first work item.

20 Claims, 6 Drawing Sheets

(56) References Cited

U.S. PATENT DOCUMENTS

| | | | |
|---|---|---|---|
| 2011/0307865 A1* | 12/2011 | Grieves | G06F 11/3414 |
| | | | 717/124 |
| 2014/0053125 A1* | 2/2014 | DeLuca | G06F 8/71 |
| | | | 717/101 |
| 2017/0116552 A1 | 4/2017 | Deodhar et al. | |
| 2018/0232296 A1 | 8/2018 | Klein | |
| 2020/0005219 A1* | 1/2020 | Stevens | G06F 8/71 |

OTHER PUBLICATIONS

International Search Report; International Application No. PCT/CN2021/108946; International Filing Date: Jul. 28, 2021; dated Nov. 4, 2021; 9 pages.

* cited by examiner

CALCULATING DEVELOPER TIME DURING DEVELOPMENT PROCESS

BACKGROUND

The present invention generally relates to programmable computing systems, and more specifically, to a computing system that aggregates developer activity data to calculate time during a development process.

Computing systems are employed to track an employee's time spent on individual activities performed to complete an overall task. The goal of monitoring the time spent by an employee is to increase effectiveness, efficiency, and/or productivity related to completing the overall task. A computer system can receive user-inputted time data regarding a description of the task and the time spent completing the task. The ability to ascertain the active time spent on a work item is important to providing insight into the effectiveness of a software development process.

SUMMARY

Embodiments of the present invention are directed to computer-implemented methods, computing systems, and computer program products for calculating an active time on a software application with respect to a first work item. A non-limiting example of a computer-implemented method includes retrieving activity data from a software development application and a plurality of input signals generated by a peripheral device. The method further includes determining a causal relationship between the input data and any events described by the activity data. In response to a determination of a causal relationship, a first time interval is calculated between an initial signal and a final signal of the plurality of input signals. The first time interval is compared to an estimated time interval. A schedule of a second work item is determined based on the comparison, wherein the first time interval relates to a first work item.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a computing system that monitors a total time a developer spends using a software development application to complete a first work item. The system separates the time the developer actively engages the software development application and time the application performs an automated function. The system calculates the developer's efficiency based on the time spent actively engaging the software development application to complete the first work item.

In modern software development processes, software companies establish a pipeline to manage the tasks that are necessary to code, test, and deploy software. A pipeline is a predefined, automated, and repeatable process that incorporates work performed on different software development applications. Companies further employ time tracking software to help keep track of a developer's engagement of a software development application toward completing a work item. The time tracking software can rely on time entries from the developer. However, the honor system time entries are not effective at accurately monitoring the time a developer is actively engaged with a software development application. Conventional time tracking systems do not distinguish between the time that a developer is actively using a software development application and the time that the software development application is performing an automated function.

One or more embodiments of the present invention address one or more of the above-described shortcomings by providing a system that aggregates data from the various software development applications. The system distinguishes between active time spent and time an application performed an automated function. Active time includes time that requires active participation from a developer, for example, code drafting and code editing. An automated function time includes time for activities that do not require participation from the developer, including compiling code, automated code error checking, and executing code. The system determines an aggregate active time spent on a work item and then returns feedback to any users.

Figure 1:
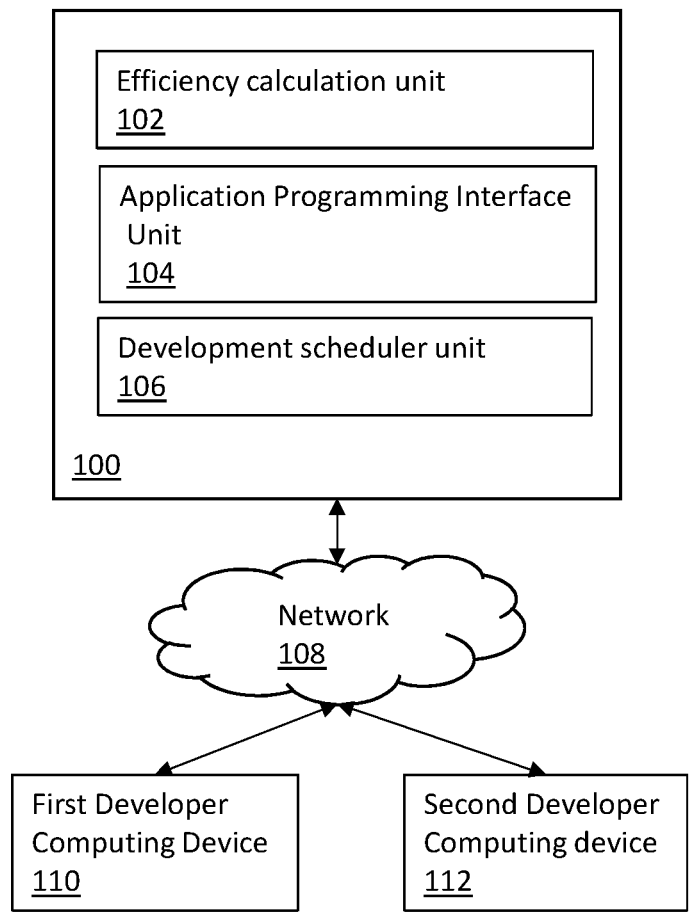
FIG. 1 illustrates a block diagram of components of a system for monitoring work activity of a developer in accordance with one or more embodiments of the present invention.

Turning now to FIG. 1, a system 100 for determining active time on a software development application is generally shown in accordance with one or more embodiments of the present invention. The system 100 includes an efficiency calculation unit 102 for determining the time spent by a software developer on a work item. The system 100 includes a suite of application programming interfaces 104 to enable the system 100 to interact with various software development applications. The system 100 further includes a development scheduler unit 106 for scheduling a software development work item. The system 100 is operable to transmit and collect data, via a network 108, from a first developer computing device 110 and a second developer computing device 112. The system 100 can be executed locally on a computing device or via an external connection, for example, on a server 50. It is appreciated that although only two developer computing devices 110 112 are illustrated, the system 100 is operable to communicate with more than two developer computing devices.

The efficiency calculation unit 102 can communicate with software development application via a respective application programming interface from the suite of application programming interfaces (APIs) 104. The efficiency calculation unit 102 can use a respective API to retrieve activity data from each software development application used by a developer. Activity data includes a description of events with respect to functions and files that are used during the operation of the application. Events are any occurrences that are detectable by a program and can be initiated by the program internally or an external source. For example, events can include an external input from a peripheral device, connection or disconnection to a peripheral device, a command, reaching a memory capacity, a programming error, or other computing occurrences.

The activity data includes log files and audit trails, which are generated by the software development application, operating system, or third party application. A log file includes what action a software development application performed and who initiated the action. An audit trail includes a sequence of events that occurred in order for a software development application to be in a particular state. Activity data includes application-specific audit trails and can be stored as text files or database tables. Activity data also include function logs that include events that may not be included in an audit trail, for example, debug messages and exceptions. Activity data can also include database or memory logs include events such as database queries, changes in data, and changes in database functionality. Activity data can include access logs that include events such as access to an application and an IP address of a user accessing a software development application. In many instances, activity data is in plain text form. In these instances, the efficiency calculation unit 102 can employ natural language (NLP) processing techniques to analyze the activity data. For example, the efficiency calculation unit can employ a word embedding model and a domain specific dictionary to derive the meaning of the text of the activity data. The activity data further includes including time stamp data for each event. If more than one function is used, the activity data includes respective events occurring for each function. The efficiency calculation unit 102 is operable to receive activity data from any software development application that includes time tracking functionality, but not necessarily as a core functionality.

The efficiency calculation unit 102 can track activity by a developer by detecting inputs from peripheral devices (e.g., keyboard, mouse, touchscreen). The efficiency calculation unit 102 includes keystroke logging functionality that can detect each keystroke, mouse click, and touch screen input entered by a developer during operation of a software development application. This functionality includes determining a type of peripheral device and an input based on the input signals. For example, the efficiency calculation unit can distinguish between a mouse click and keyboard stroke based on the input signal. Furthermore, the efficiency calculation unit 102 can determine the input based on the input signals. For example, the efficiency calculation unit 102 can determine that a developer wrote the word "mouse" on a keyboard based on the input signals.

The efficiency calculation unit 102 can further determine whether a software development application is operating an automated function or is the developer actively engaging the application by comparison of the activity data and input signals from peripheral devices. In some embodiments of the present invention, the efficiency calculation unit 102 can be arranged as a neural network and employ machine learning algorithms to detect a relationship between input signals from peripheral devices and events in a software development application. The efficiency calculation unit 102 can apply a machine learning algorithm and receive as inputs, the input signals from a peripheral device and the activity data, for example, the audit trail. The efficiency calculation unit 102 can be trained to predict whether a relationship exists between the input signals and the events described in the activity data. A relationship exists if the input signals from the peripheral devices cause the generation of detectable events logged into the activity data. Whether a relationship exists between the input signals and the events described in the activity data is based on whether a quantifiable result is within a statistical lower bound and upper bound of a confidence interval. In the event that the developer is working offline, the efficiency calculation unit 102 can receive a log of the input signals from a peripheral device and the activity data from a memory storage device.

The efficiency calculation unit 102 can be trained to distinguish between a developer initiating an automated function and a developer actively using a function of a software development application. For example, the efficiency calculation unit 102 can be trained to rely on various parameters such as frequency of input signals, number of input signals, nature of event caused by input signals, or various other relevant parameters. For example, if the efficiency calculation unit 102 receives an input signal from a first developer's computing device 110 and an audit trail from a software application, the audit trail can indicate that the input signal caused an automated function to initiate. In this instance, the efficiency calculation unit 102 can be trained to recognize that the developer only initiated the automated function and the developer is not actively working on the software development application. If the software development application is performing an automated function, the activity data will still show a record of the events detected during the performance of the automated function. In this instance, the efficiency calculation unit 102 can still receive any input signals from any peripheral devices. However, the efficiency calculation unit 102 is trained to recognize that the events are not caused by the input signals, and rather are due to automated functionality of the software development application.

In the instance that the efficiency calculation unit 102 determines that the developer is actively participating, it can calculate a length of a time interval between the initial input signal from the peripheral device and the final input signal from any peripheral device. The efficiency calculation unit 102 can further calculate a unit time interval between each consecutive input signal. If any unit time interval exceeds a threshold amount (e.g., the developer did not enter any inputs for a half-hour), the efficiency calculation unit 102 can deduct the unit time interval (inactivity time) from the time interval between the initial input signal and the final input signal. The time value calculated after subtracting inactivity time is considered to be the active time value.

The efficiency calculation unit 102 can calculate a sum of active time values for each instance that a developer is working toward a work item. The efficiency calculation unit 102 can calculate the active time value for each function of each software development application that a developer uses toward a same work item. In other words a developer may prefer a graphical user interface of a code editor from one software development application and prefer testing capability of another software development application. The efficiency calculation unit 102 can calculate an active time spent value for both software development applications and generate a sum for both. The suite of application programming interfaces 104 enables the efficiency calculation unit to communicate with multiple software development applications, even in the instance that one application is incompatible with another application. The APIs enable the efficiency calculation unit 102 to retrieve activity data and input signal data regardless of the compatibility of one software development application to another software application.

The efficiency calculation unit 102 can further determine whether the active time spent value needs to be adjusted based on a developer working on more than one work item at the same time. Periodically, a developer may operate more than one software development application at the same time, use more than one function of an application, or use one function to work on more than one work item. For example, a software developer may use a code editor to edit code for two different work items. The efficiency calculation unit 102 can distinguish a first work item from a second work item, based on a work item identification. A work item identification is a set of numbers, title, code, or words used to identify a respective work item. Software developers store code files in repositories and retrieve the code files when needed. Each code file retrieved from the repository includes a pathname, which is a string of characters that includes a location of each code file in the repository. The pathname can include a work item identification. If a developer has created more than one code file for a work item, each code file can include a pathname that includes the work item identification. The efficiency calculation unit 102 can analyze the pathname and compare sections of the pathname with a master list of work items. For example, a pathname may include the " . . . string/acme2/elevatorsensor/ . . . " and a work item identification can be "elevatorsensor". The efficiency calculation unit 102 can search the pathname for a string of characters that match the string "elevatorsensor" to determine the work item of the code file the developer has retrieved. Therefore, even if a developer is reviewing another developer's code, the efficiency calculation unit 102 can attribute the time to the correct work item.

The efficiency calculation unit 102 is operable to receive activity data from multiple software development applications. The efficiency calculation unit 102 can determine that a developer is using a software development application to complete a first work item. The efficiency calculation unit 102 can further determine that the developer is also using the software development application to complete a second work item. In the event that the efficiency calculation unit 102 determines that a developer is working on a second work item, it can calculate a length of time that the developer worked on the second item. The method for calculating the time is as described above using time stamps of the input signals with the exception that inactivity time is not subtracted from the time interval attributable to the second work item. The time spent on the second work item is deducted from the active time spent value.

In accordance with one or more embodiments of the present invention, the efficiency calculation unit 102 can further determine an efficiency of a developer as to the completion of a work item. The efficiency calculation unit 102 is operable to determine an actual time spent value for a developer on the work item and compare that value to an estimated length of time. The efficiency calculation unit 102 can determine whether the developer's active time is within an upper threshold time or a lower threshold time of the estimated length of time. If the developer's active time spent value is greater than the estimated length of time, the developer can be deemed to have below average efficiency. On the other hand, if the developer's active time spent value is lower than then the estimated length of time, the developer can be deemed to have an above average efficiency. The estimated length of time can be determined by a user, for example, a supervisor or program manager.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using a efficiency calculation unit 102, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The efficiency calculation unit 102 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the efficiency calculation unit 102 that carry electronic messages between simulated neurons are provided with numeric weights that correspond to the strength or weakness of a given connection. During training, The weights can be adjusted and tuned based on experience, making efficiency calculation unit 102 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

The suite of application programming interfaces 104 enables the efficiency calculation unit 102 to communicate with different software development applications. An application programming interface (API) is a software intermediary that enables the efficiency calculation unit 102 to communicate with a software development application. The efficiency calculation unit 102 can select an appropriate API to communicate with a software development application. The selected application programming interface enables the efficiency calculation unit 102 to request and receive data to determine a description of the software development application and the time spent using the application. For example, the efficiency calculation unit 102 can request and receive a log file or an audit trail from a software development application via an API.

The development scheduler unit 106 is operable to schedule work items to developers based at least in part on the calculated active time spent value. The development scheduler unit 106 can receive a delivery schedule for a software application under development. Based on an expected completed date, the development scheduler unit 106 can establish target completion dates for work items. The scheduler unit 106 can create or adjust a work order and transmit the work order to a developer. The work order can be in the form of an electronic mail, a created item on an electronic calendar, or other electronic communication.

The system 100 can be in operable communication with a first developer computing device 110 and a second developer computing device 112 via a communication network 108. The system 100 can connect to the communication network via a communications port, a wired transceiver, a wireless transceiver, and/or a network card. The communication network 108 can transmit data using technologies such as Ethernet, fiber optics, microwave, xDSL (Digital Subscriber Line), Wireless Local Area Network (WLAN) technology, wireless cellular technology, 5G, Bluetooth technology and/or any other appropriate technology.

The calculation unit 102 is in operable communication, via the communication network 108, with the first developer computing device 110 and the second developer computing device 112. The efficiency calculation unit 102 can further identify each computing device, for example, based on a MAC address, IP address, registration code, or other appropriate identification of combination thereof. The efficiency calculation unit 102 can further be in operable communication with one or more software development applications operated on the first and second developer computing devices 110 112. The efficiency calculation unit 102 can identify which developer is using which software development application based on which developer is logged into the respective application. If a developer is logged into multiple software development applications, the efficiency calculation unit 102 can identify the developer identity based on being logged on to each application.

Figure 2:
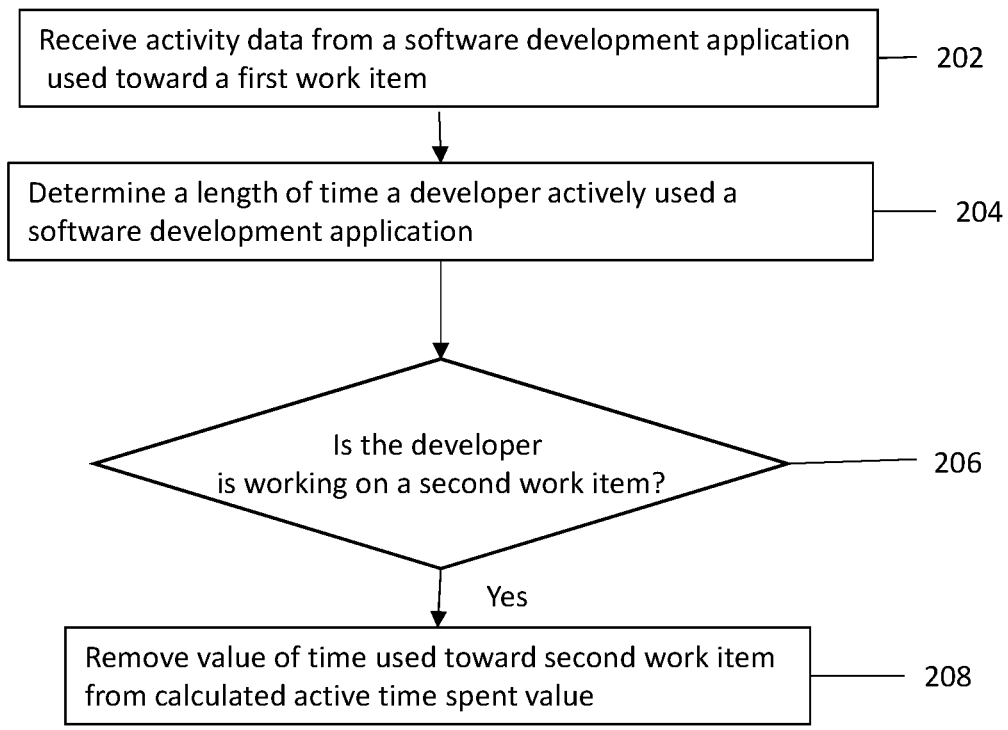
FIG. 2 illustrates a flow diagram of a process for determining active work performed by a developer in accordance with one or more embodiments of the present invention

Referring to FIG. 2, a method 200 for determining an active time spent value in accordance with one or more embodiments of the present invention is illustrated. At block 202, a system is in operable communication with a user's computing device and continuously receives activity data from any software development applications running on the user's computer's computing device. The activity data includes a description of the software applications used, functions of the software applications used by a developer, and time data indicating beginning and ending times for each of the functions. The activity data can be included in a log file or an audit trail of a software development application. The system can further receive information regarding input signals from an peripheral devices connected to the user's computing device.

At block 204, the system determines a length of time that a developer was actively using each software development application. The system can calculate the active time spent value by retrieving the activity data and input data from peripheral devices. The system can apply a machine learning algorithm and receive as inputs, the input signals from a peripheral device and the activity data, for example, the audit trail. The system is trained to predict whether a relationship exists between the input signals from a user's peripheral device and the events described in the activity data. The system will find a relationship between the input signals and the events if the input signals from the peripheral devices cause the generation of the events that are logged into the activity data. The system can then calculate a length of a time interval between the initial input signal from the peripheral device and the final input signal from any peripheral device. The system can further calculate a unit time interval between each consecutive input signal. If any unit time interval exceeds a threshold amount, the deducts the unit time interval from the time interval between the initial input signal and the final input signal.

At block 206, the system verifies whether a developer worked on the first work item or a second work item. The system can analyze the pathname for each file worked on by the developer and compare sections of the pathname with a master list of work items. In no pathname for a second work item is found, no further analysis is necessary. If a pathname for a second work item is found, the system analyzes the input data to detect an initial and final time stamp related to the second work item. The system calculates the second work item time interval between the initial and final time signals from any peripheral device. The system then subtracts the time interval for the second work item from the active time spent value for the first work item at block 208.

Figure 3:
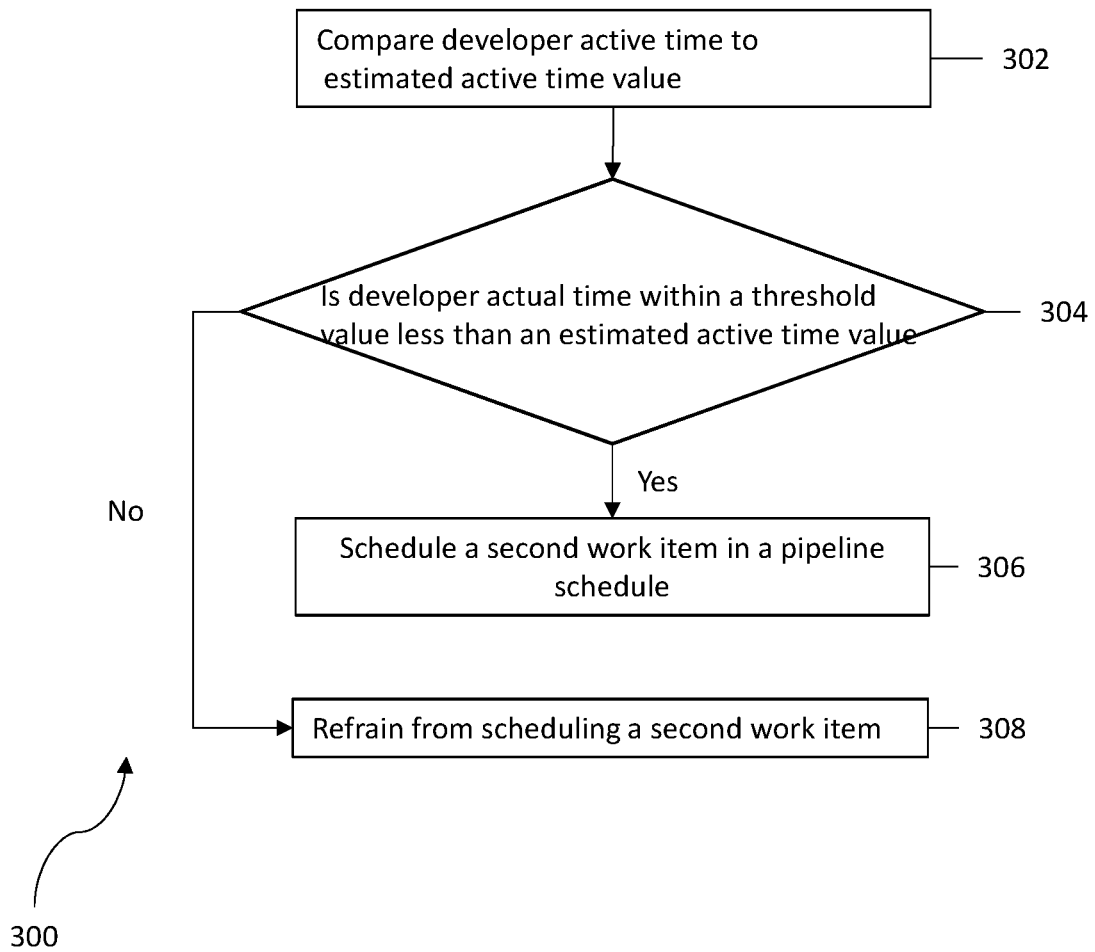
FIG. 3 illustrates a flow diagram of a process for scheduling a work item in accordance with one or more embodiments of the present invention.

Referring to FIG. 3, a method 300 for adjusting a pipeline schedule is illustrated. At block 302, the system compares the developer's current active time spent value to an estimated active time value. The estimated active value is an estimated amount of the total active time required to complete a work item. The estimated active time value can be determined by a user, for example, a project manager or supervisor.

At block 304, the system determines whether the developer's actual time spent is within a threshold value less than the estimated time spent value. The threshold value can be determined by a user, for example, a project manager. The threshold value can be a fixed time or a percentage of the estimated active time value. For example, the threshold value is five hours and the estimated active time spent value is thirty hours. The system can determine whether the developer has twenty-five hours of active time. If, for example, the threshold value is twenty percent, the system can also determine whether the developer has at least twenty-five hours of active time.

At block 306, if the developer's actual time spent is within the threshold of the estimated active time value, the system schedules a second work item. For example, if the developer has worked twenty-five hours on a work item, the developer is at the five hour threshold value of the estimated thirty hours. In response to working twenty-five hours, the second work item can be scheduled for the developers prior to the developer's completion of the first work item. At block 308, if the developer has not within a threshold value of the average active time spent by a threshold amount, the system refrains from scheduling the second work item.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
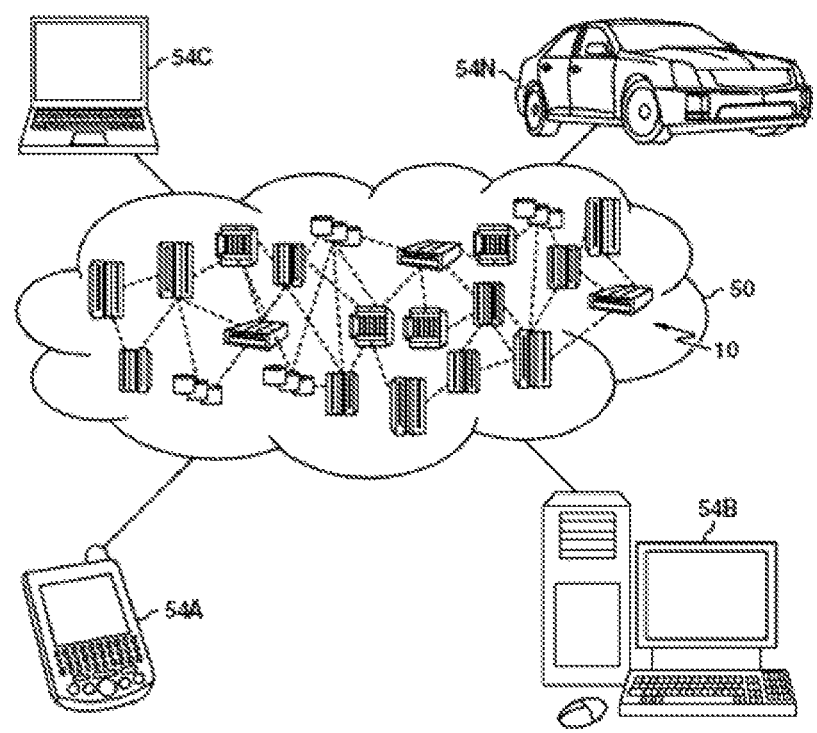
FIG. 4 depicts a cloud computing environment according to one or more embodiments of the present invention.

Referring now to FIG. 4 illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
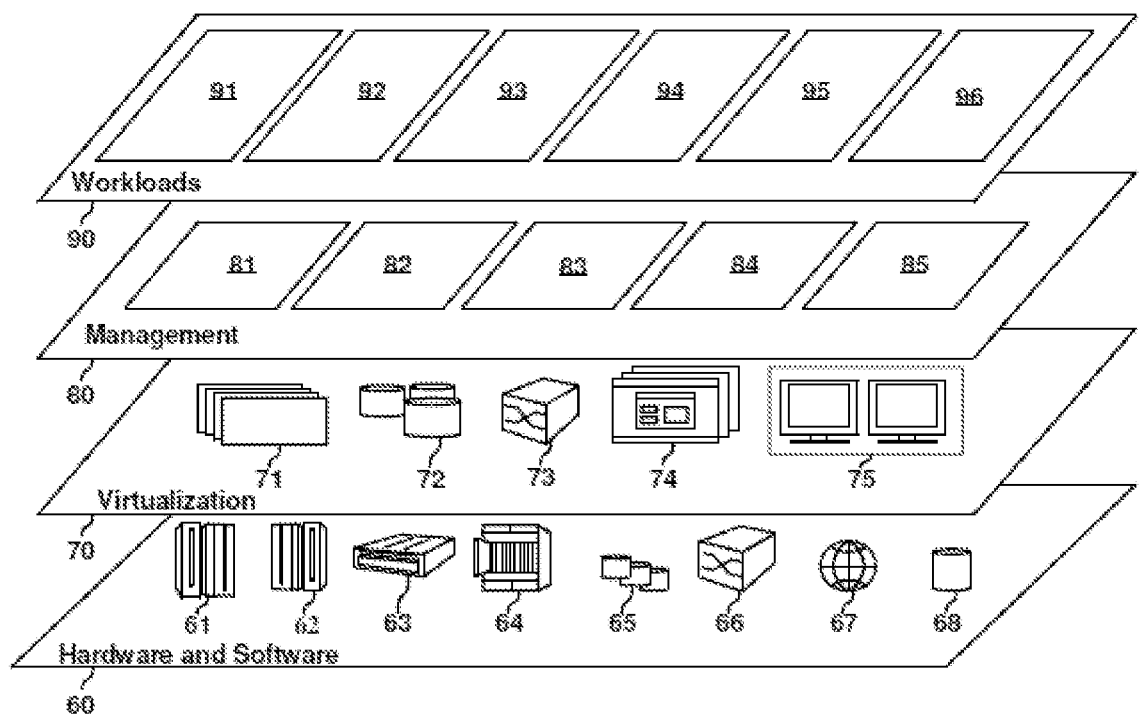
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aggregating developer log data 96.

Figure 6:
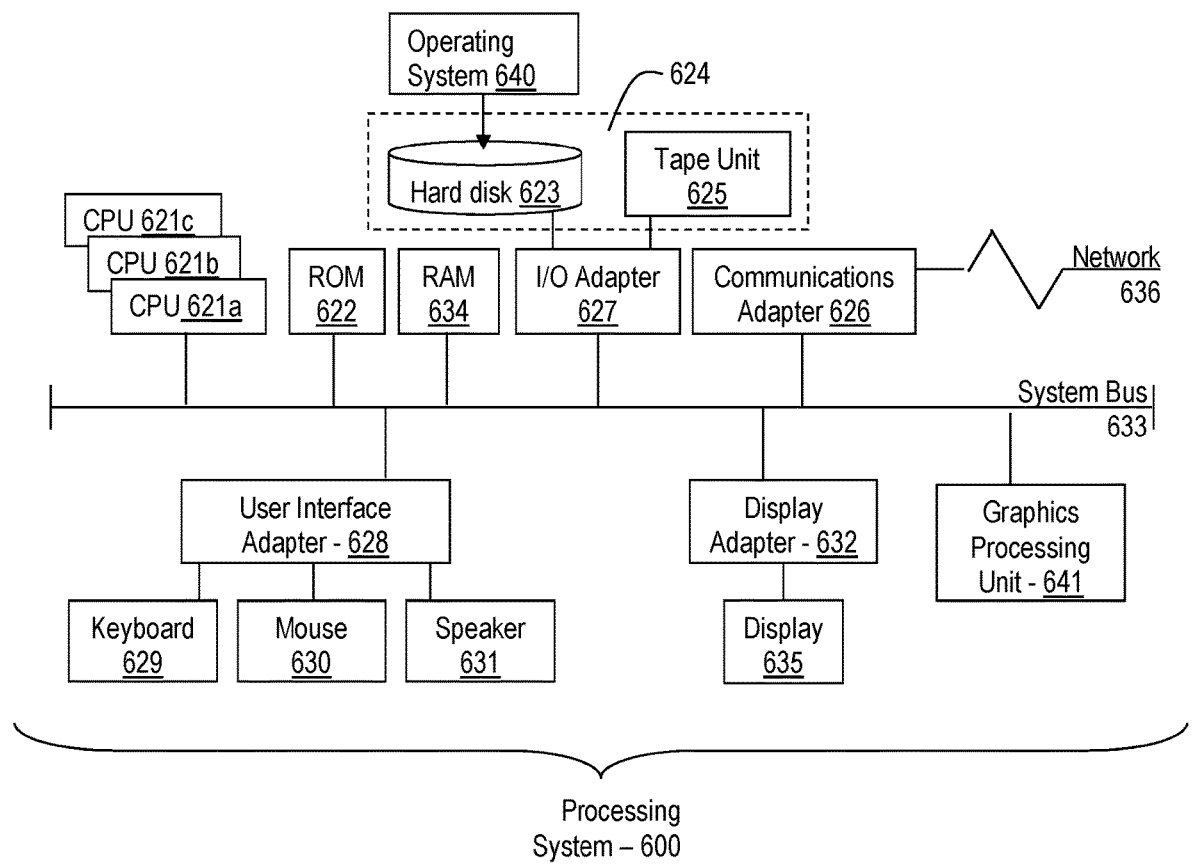
FIG. 6 depicts a block diagram of a computer system for use in implementing one or more embodiments of the present invention.

It is understood that the present disclosure is capable of being implemented in conjunction with any other type of computing environment now known or later developed. For example, FIG. 6 depicts a block diagram of a processing system 600 for implementing the techniques described herein. In examples, the processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of the processing system 600.

Further depicted are an input/output (I/O) adapter 627 and a network adapter 626 coupled to the system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to the system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to the system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. An input device 629 (e.g., a keyboard, a microphone, a touchscreen, etc.), an input pointer 630 (e.g., a mouse, trackpad, touchscreen, etc.), and/or a speaker 631 may be interconnected to system bus 633 via user interface adapter 628, which may include, for example, a Super I/O chip integrating multiple device adapters into a single integrated circuit.

In some aspects of the present disclosure, the processing system 600 includes a graphics processing unit 641. Graphics processing unit 641 is a specialized electronic circuit designed to manipulate and alter memory to accelerate the creation of images in a frame buffer intended for output to a display. In general, graphics processing unit 641 is very efficient at manipulating computer graphics and image processing and has a highly parallel structure that makes it more effective than general-purpose CPUs for algorithms where processing of large blocks of data is done in parallel.

Thus, as configured herein, the processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in the processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
retrieving, by a processor, activity data from a plurality of software development applications and a plurality of input signals generated by a peripheral device, wherein the activity data comprises a description of events with respect to functions and files for each respective software development application;
training a machine learning model to predict whether a relationship exists between the input signals and the events described in the activity data, wherein the machine learning model is trained to distinguish between a developer initiating an automated function of a software development application and a developer actively using a function of the software development application;
determining, by the processor using the trained machine learning model, a first causal relationship between the plurality of input signals and the activity data, the first causal relationship comprising an indication that a developer is actively using a first software development application of the plurality of software development applications to complete a first work item;
calculating, by the processor and in response to the determination of the first causal relationship, a first time interval between an initial signal and a final signal of the plurality of input signals, the first time interval representing a maximum duration for the first work item;
determining, by the processor using the trained machine learning model, a second causal relationship between the plurality of input signals and the activity data, the second causal relationship comprising an indication that the developer is also actively using the first software development application to complete a second work item during an overlapping time span with the first work item;
calculating, in response to the determination of the second causal relationship, a second time interval between the initial signal and the final signal;
removing the second time interval from the first time interval to define an active time spent value for the first work item;
comparing, by the processor, the active time spent value to an estimated time interval; and
automatically modifying, by the processor and on behalf of a user, a schedule of an additional work item of the user based on the comparison.

2. The computer-implemented method of claim 1 further comprising:
calculating a respective time interval between each consecutive input signal of the plurality of input signals;
comparing each respective time interval with a threshold time interval;
subtracting from the first time interval a length of any respective time interval that exceeds the threshold time interval.

3. The computer-implemented method of claim 1 further comprising selecting an application programming interface from a suite of application programming interfaces to communicate with the software development application.

4. The computer implemented method of claim 1, wherein comparing the first time interval to an estimated time interval comprises determining whether the first time interval is a threshold time interval less than the estimated time interval.

5. The computer implemented method of claim 1 further comprising:
   detecting the software application operating on a file;
   detecting a pathname of the file; and
   comparing a first work item identification with the pathname to detect the first work item identification.

6. The computer implemented method of claim 1, wherein the activity data includes a log file or an audit trail.

7. The computer implemented method of claim 1, wherein the activity data comprises plain text, the method further comprises applying natural language processing techniques to understand a meaning of the plain text.

8. A system comprising:
   a memory having computer readable instructions; and
   one or more processors for executing the computer readable instructions, the computer readable instructions controlling the one or more processors to perform operations comprising:
      retrieving, by a processor, activity data from a plurality of software development applications and a plurality of input signals generated by a peripheral device, wherein the activity data comprises a description of events with respect to functions and files for each respective software development application;
      training a machine learning model to predict whether a relationship exists between the input signals and the events described in the activity data, wherein the machine learning model is trained to distinguish between a developer initiating an automated function of a software development application and a developer actively using a function of the software development application;
      determining, by the processor using the trained machine learning model, a first causal relationship between the input data and the activity data, the first causal relationship comprising an indication that a developer is actively using a first software development application of the plurality of software development applications to complete a first work item;
      calculating, by the processor and in response to the determination of the first causal relationship, a first time interval between an initial signal and a final signal of the plurality of input signals, the first time interval representing a maximum duration for the first work item;
      determining, by the processor using the trained machine learning model, a second causal relationship between the plurality of input signals and the activity data, the second causal relationship comprising an indication that the developer is also actively using the first software development application to complete a second work item during an overlapping time span with the first work item;
      calculating, in response to the determination of the second causal relationship, a second time interval between the initial signal and the final signal;
      removing the second time interval from the first time interval to define an active time spent value for the first work item;
      comparing, by the processor, the active time spent value to an estimated time interval; and
      automatically modifying, by the processor and on behalf of a user, a schedule of an additional work item of the user based on the comparison.

9. The system of claim 8, the operations further comprising:
   calculating a respective time interval between each consecutive input signal of the plurality of input signals;
   comparing each respective time interval with a threshold time interval;
   subtracting from the first time interval a length of any respective time interval that exceeds the threshold time interval.

10. The system of claim 8, the operations further comprising selecting an application programming interface from a suite of application programming interfaces to communicate with the software development application.

11. The system of claim 8, wherein comparing the first time interval to an estimated time interval comprises determining whether the first time interval is a threshold time interval less than the estimated time interval.

12. The system of claim 8, the operations further comprising:
   detecting the software application operating on a file;
   detecting a pathname of the file; and
   comparing a first work item identification with the pathname to detect the first work item identification.

13. The system of claim 8, wherein the activity data includes a log file or an audit trail.

14. The system of claim 8, wherein the activity data comprises plain text, the method further comprises applying natural language processing techniques to understand a meaning of the plain text.

15. A computer program product comprising a computer readable storage medium having program instructions embodied therewith, the program instructions executable by a processor to cause the processor to perform operations comprising:
   retrieving, by a processor, activity data from a plurality of software development applications and a plurality of input signals generated by a peripheral device, wherein the activity data comprises a description of events with respect to functions and files for each respective software development application;
   training a machine learning model to predict whether a relationship exists between the input signals and the events described in the activity data, wherein the machine learning model is trained to distinguish between a developer initiating an automated function of a software development application and a developer actively using a function of the software development application;
   determining, by the processor using the trained machine learning model, a first causal relationship between the input data and the activity data, the first causal relationship comprising an indication that a developer is actively using a first software development application of the plurality of software development applications to complete a first work item;
   calculating, by the processor and in response to the determination of the first causal relationship, a first time interval between an initial signal and a final signal of the plurality of input signals, the first time interval representing a maximum duration for the first work item;
   determining, by the processor using the trained machine learning model, a second causal relationship between the plurality of input signals and the activity data, the second causal relationship comprising an indication that the developer is also actively using the first software development application to complete a second work item during an overlapping time span with the first work item;

calculating, in response to the determination of the second causal relationship, a second time interval between the initial signal and the final signal;

removing the second time interval from the first time interval to define an active time spent value for the first work item;

comparing, by the processor, the active time spent value to an estimated time interval; and automatically modifying, by the processor and on behalf of a user, a schedule of an additional work item of the user based on the comparison.

16. The computer program product of claim 15, the operations further comprising:

calculating a respective time interval between each consecutive input signal of the plurality of input signals;

comparing each respective time interval with a threshold time interval;

subtracting from the first time interval a length of any respective time interval that exceeds the threshold time interval.

17. The computer program product of claim 15, the operations further comprising selecting an application programming interface from a suite of application programming interfaces to communicate with the software development application.

18. The computer program product of claim 15, wherein comparing the first time interval to an estimated time interval comprises determining whether the first time interval is a threshold time interval less than the estimated time interval.

19. The computer program product of claim 15, the operations further comprising:
detecting the software application operating on a file;
detecting a pathname of the file; and
comparing a first work item identification with the pathname to detect the first work item identification.

20. The computer program product of claim 15, wherein the activity data includes a log file or an audit trail.

* * * * *